United States Patent [19]

Kirchner et al.

[11] Patent Number: 4,627,535

[45] Date of Patent: Dec. 9, 1986

[54] CONTAINER FOR MAGNETIC TAPE CASSETTES

[75] Inventors: Balthasar Kirchner; Siegfried Schleicher, both of Eferding, Austria

[73] Assignee: Ernst Stadelmann Gesellschaft m.b.H., Bahnhofstrasse, Austria

[21] Appl. No.: 705,989

[22] Filed: Feb. 27, 1985

[30] Foreign Application Priority Data

May 29, 1984 [EP] European Pat. Off. ........ 84890097.3

[51] Int. Cl.⁴ .................. B65D 85/672; B65D 1/24
[52] U.S. Cl. .................................. 206/387; 206/425; 220/22.3
[58] Field of Search ............... 206/425, 387, 444; 220/22.1, 22.3

[56] References Cited

U.S. PATENT DOCUMENTS

| | | | |
|---|---|---|---|
| 464,544 | 12/1891 | Wood | 220/22.3 |
| 2,758,602 | 8/1956 | Anderson | 220/22.3 |
| 2,781,125 | 2/1957 | Mills | 220/22.3 |
| 4,366,904 | 1/1983 | Roskvist | 220/22.3 |

FOREIGN PATENT DOCUMENTS

| | | | |
|---|---|---|---|
| 14667 | 8/1980 | European Pat. Off. | 206/425 |
| 85911 | 8/1983 | European Pat. Off. | 206/387 |
| 82/01810 | 6/1982 | PCT Int'l Appl. | 206/444 |
| 614981 | 12/1948 | United Kingdom | 220/22.3 |

Primary Examiner—William Price
Assistant Examiner—Brenda J. Ehrhardt
Attorney, Agent, or Firm—Karl F. Ross; Herbert Dubno

[57] ABSTRACT

A container for magnetic tape cassettes comprises a plurality of receptacles for slidably receiving respective cassettes. Each of said receptacles comprises tracks provided at mutually opposite side walls or partitions. In order to provide a container which permits a convenient handling of the cassettes and from which the cassettes can easily be taken, each receptacle provides fulcrums about which the associated cassette can be tilted. Each track defines a throat, which has a width that is slightly in excess of the thickness of a cassette so that a cassette contained in each receptacle can be tilted about fulcrums formed by the tracks at the throats. The tracks of each receptacle comprise stops, which limit the extent of the tilting movement of the cassette. Each cassette is supported by laterally spaced apart supports provided adjacent to the bottom of the container.

10 Claims, 3 Drawing Figures

CONTAINER FOR MAGNETIC TAPE CASSETTES

BACKGROUND OF THE INVENTION

1. Field of the Invention

This invention relates to a container for magnetic tape cassettes or other parallelepipedic articles, comprising a plurality of receptacles for slidably receiving respective cassettes, which receptacles comprise tracks provided on mutually opposite side walls and/or partitions of the container.

2. Description of the Prior Art

Magnetic tape cassettes are used not only for recording video and/or sound signals but are increasingly used for the storage of data for use in control systems and computer installations. Because the magnetic tapes are very delicate recording mediums, special containers have been developed for the storage and handling of such cassettes. Most of said containers consist of a box having a hinged cover and adapted to contain only one cassette so that such boxes cannot be used for an orderly storage of a plurality of cassettes. It has also been proposed to connect individual boxes by sliding or plug joints to form larger units but in that case a systematic storage of a plurality of cassettes is also complicated and the cassettes are not clearly arranged. Particularly for cassettes for music, containers have been provided which comprise a plurality of receptacles for respective cassettes. These receptacles are arranged in a row and are defined by parallel straight ribs, which constitute tracks for slidably receiving the cassettes. When cassettes are contained in such containers, only the back egde of each cassette remains visible from the outside and that back edge cannot be provided with an inscription or other marking so that it is not possible quickly to become aware of the contents of the container or quickly to find a specific cassette. It is also difficult to take a cassette out of the container because the cassettes are closely packed in the receptacles and can be grasped only with the fingertips.

SUMMARY OF THE INVENTION

For this reason it is an object of the invention to eliminate the disadvantages mentioned above and to provide a container which is of the kind described first hereinbefore and is simple in structure and permits a convenient handling of its contents and a quick and systematic arranging of and searching for the cassettes even if a relatively large number of cassettes are contained in the container.

This object is accomplished in accordance with the invention in that laterally spaced apart supports for the cassettes are provided near the bottom of the container each track defines a throat having a width slightly in excess of the thickness of a cassette so that the cassette can be tilted in said receptacle about fulcrums formed by the tracks at the throats, and the tracks are provided with stops, which limit the extent of the tilting movement. In such a container, the cassettes which have been slidably received by the receptacles can be tilted about a longitudinal axis of the cassette in a direction which is transverse to the direction in which the cassette has been inserted so that the cassettes arranged in the container can be handled like a block card file. The cassettes can be thumbed through in succession in such a manner that the inscription in such a manner that the inscription-bearing forward face of each cassette will be exposed so that a specific cassette can easily be found.

Because each cassette can be tilted, it can easily be removed from the container when the row formed by the cassettes has be unfolded at the desired position so that there is adequate space for a firm grasping of the desired cassette. The laterally spaced apart supports will hold the cassette clear of the bottom of the container so that there will be no damage to the magnetic tape, which is exposed adjacent to the window of the cassette for the contact of the tape with the magnetic head. In order to permit the cassettes to be handled as desired, the tracks which cooperate with the supports are required only to retain the cassettes to a certain extent adjacent to the throats and must constitute the stops which limit the extent of the tilting movement. These requirements can be met by tracks having various designs without a need for complicated movable parts.

Within the scope of the invention each support may have a supporting surface which has an intermediate apex and slopes down from said apex on opposite sides thereof. Such a convex or angled support will facilitate the tilting movement and will ensure that the cassette will not remain in an unstable intermediate position but will rock to a stable inclined position.

The fulcrums defining the throats might be close to the support. But in that case the extent of the tilting movement of the cassettes would be relatively large in the upper portion of the container and would require a large space in that region. But in the throats of the tracks are spaced above the supports, a given tilting movement will result in a smaller excursion at the top of the container, so that less space will be required and the handling will also be improved.

In accordance with a favorable further feature of the invention the stops provided on the tracks consist of guiding surfaces, which symmetrically diverge from the throat. Such guiding surfaces will snugly engage the cassettes which have been tilted because the guiding surfaces constitute sliding surfaces which uniformly lead toward the throat.

In a particularly advantageous embodiment of the invention the tracks are terminated at the top of each receptacle by transverse lugs, which define between them an intermediate gap for receiving a lateral guide projection provided on each cassette, and those ends of the transverse lugs which define said gap may be curved or angled downwardly. As most cassettes are provided with a lateral guide projection, the transverse lugs which match said guide projection will prevent an inadvertent dropping of the cassettes out of the receptacles because when the cassettes have been tilted their guide projections engage the transverse lugs from below so that the cassettes can no longer fall or be pulled out of the tracks. The cassettes cannot be removed unless they are in an unstable intermediate position in which their guide projections are aligned with the gaps. As a result, an undesired dropping of the cassettes out of the container will be prevented.

In accordance with a further preferred feature of the invention those tracks and supports which are associated with a wall of the container are combined in a structural unit, which can be prefabricated. In that case the container, on the one hand, and the tracks and supports on the other hand, are manufactured separately so that their manufacture will be much less expensive. Besides, existing containers may subsequently be provided with receptacles for cassettes in that the prefabricated structural units are installed.

DETAILED DESCRIPTION OF THE PREFERRED EMBODIMENT

Figure 1:
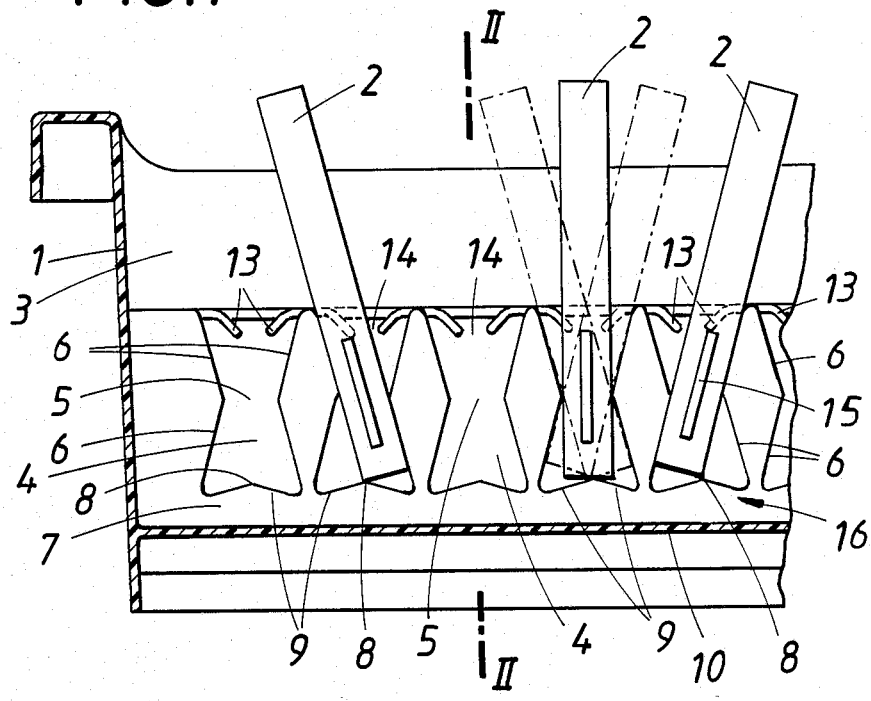
FIG. 1 is a longitudinal sectional view showing a container in accordance with the invention.
Figure 2:
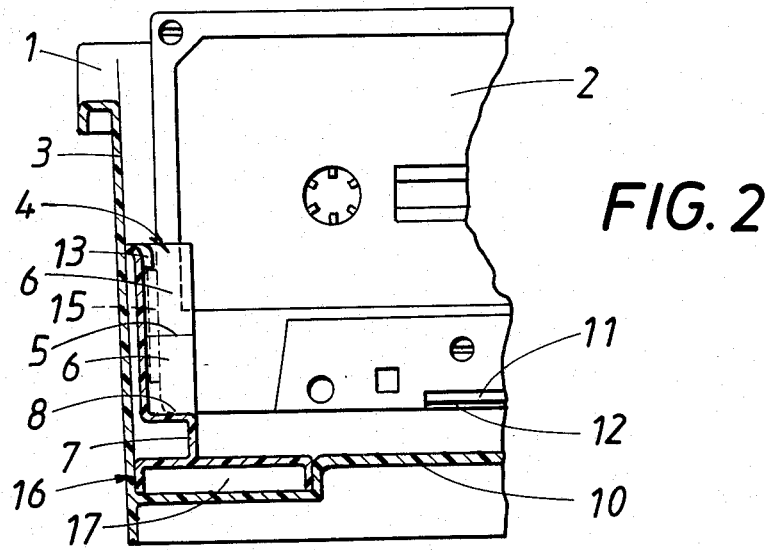
FIG. 2 is a transverse sectional view taken on line II—II in FIG. 1.
Figure 3:
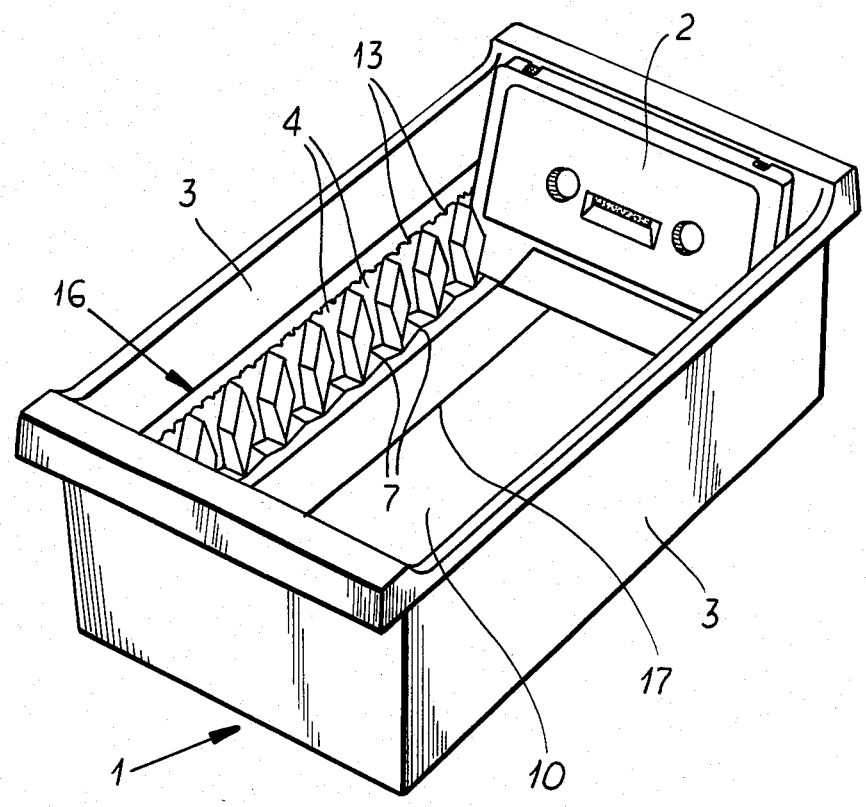
FIG. 3 is a front perspective view of the container.

The container 1 is provided with a cover, not shown, and has mutually opposite vertical side walls 3 provided with tracks 4, which define receptacles, into which a plurality of cassettes 2 can be slidably inserted from the top of the container. Each track 4 defines a throat 5, which has a width that is slightly in excess of the thickness of a cassette. Each track 4 also has guiding surfaces 6, which diverge upwardly and downwardly from that throat 5 so that the tracks 4 form fulcrums are disposed at said throats 5 and about which a cassette 2 can be tilted. Each cassette 2 which has been inserted into one of the tracks 4 is slidably supported at its ower edge on lateral supports 7, each of which has a supporting surface 9, which has a central apex 8 and slopes down from said appex on opposite sides thereof.

In such receptacles the cassettes 2 can be tilted forwardly and rearwardly in the tracks 4 about an axis which is defined by the throats 5 and the guiding surfaces 6 constitute stops for limiting the extent of the tilting movement. As a result, the cassettes 2 which have been inserted into the container 1 can be handled like a block card file. The tilting movement is facilitated by the supports 7, which slidably support each cassette at a distance above the bottom 10 of the container so that the magnetic tape exposed in the open window 11 of the cassette will not be damaged by a sliding contact with the bottom 10 of the container as the cassette is tilted.

In order to avoid an inadvertent dropping of the cassettes 2 from the tracks 4, transverse lugs 13 are provided at the top of each track 4 and close the tracks except for a central gap 14, which constitutes a passage for a lateral guide projection 15 of each cassette 2. Each transverse lug 13 has an end portion which is curved or angled downwardly so that when a cassette 2 has been tilted the end portions of the transverse lugs 13 will engage by the guide projections from below and will prevent the cassettes 2 from falling out of the container. Only when the cassettes are in an intermediate unstable position in which the guide projections 15 register with the gaps 14 can the cassettes 2 be taken from the container 1.

The manufacture can be simplified in that the tracks 4 and the supports 7 associated with each side wall 3 are combined in a structural unit 16, which can be prefabricated and which is fitted into a recess 17 that is formed in the bottom 10 of the container and extends along the adjacent side wall 3. In that case much simpler molds can be used to make the parts of the container from plastic.

We claim:

1. In a container for holding parallelepipedic articles comprising:
   a bottom and side walls defining an upwardly open space,
   said space being delimited at least in part by two horizontally spaced apart vertical walls rising from said bottom, and
   a plurality of receptacles provided between said two vertical walls and adapted to slidably receive respective ones of said articles, each of said receptacles comprising two upwardly open horizontally spaced apart tracks extending adjacent to confronting side faces of respective ones of said vertical walls for receiving opposite edges of respective articles,
   the improvement residing in that
   each of said receptacles comprises laterally spaced apart supports disposed near said bottom and adapted to slidably support one of said articles received in the respective receptacle, each of said tracks of each of said receptacles has above the respective supports a pair of formations projecting toward one another and defining a respective throat engageable with a respective one of said articles in said receptacle on each side of said article,
   said throat of each of said receptacles are horizontally aligned so that one of said articles which is contained in one of said receptacles and has a thickness that is slightly smaller than the width of each of said throats is tiltable in said receptacle about fulcrums formed by said tracks at said throats, and
   said tracks of each of said receptacles are provided with stops for limiting the tilting movement of such article in said receptacle,
   each of said tracks having horizontally spaced apart guiding surfaces, which diverge symmetrically from said throat in upward and downward directions.

2. The improvement set forth in claim 1 as applied to a container for holding parallelepipedic articles consisting of magnetic tape cassettes.

3. The improvement set forth in claim 1, wherein those of said tracks and supports which are disposed near one side face of one of said walls constitute a structural unit.

4. The improvement set forth in claim 3, wherein said unit is a prefabricated unit.

5. The improvement set forth in claim 1 as applied to a container in which both said vertical walls consist of side walls.

6. In a container for holding parallelepipedic articles comprising
   a bottom and side walls defining an upwardly open space,
   said space being delimited at least in part by two horizontally spaced apart vertical walls rising from said bottom, and
   a plurality of receptacles provided between said two vertical walls and adapted to slidably receive respective ones of said articles, each of said receptacles comprising two upwardly open horizontally spaced apart tracks extending adjacent to confronting side faces of respective ones of said vertical walls for receiving opposite edges of respective articles,
   the improvement residing in that
   each of said receptacles comprises laterally spaced apart supports disposed near said bottom and adapted to slidably support one of said articles received in the respective receptacle,
   each of said tracks of each of said receptacles has above the respective supports a pair of formations projecting toward one another and defining a respective throat engageable with a respective one of said articles in said receptacle on each side of said article, said throats of each of said receptacles are horizontally aligned so that one of said articles which is contained in one of said receptacles and has a thickness that is slightly smaller than the width of each of said throats is tiltable in said receptacle about fulcrums formed by said tracks at said throats, and said tracks of each of said receptacles are provided with stops for limiting the tilting movement of such article in said receptacle, each of said supports having a generally upwardly facing supporting surface which has an intermediate apex and slopes from said apex on opposite sides thereof.

7. In a container for holding parallelepipedic articles comprising:

a bottom and side walls defining an upwardly open space, said space being delimited at least in part by two horizontally spaced apart vertical walls rising from said bottom, and a plurality of receptacles provided between said two vertical walls and adapted to slidably receive respective ones of said articles, each of said receptacles comprising two upwardly open horizontally spaced apart tracks extending adjacent to confronting side faces of respective ones of said vertical walls for receiving opposite edges of respective articles.

the improvement residing in that each of said receptacles comprising laterally spaced apart supports disposed near said bottom and adapted to slidably support one of said articles received in the respective receptacle, each of said tracks of each of said receptacles has above the respective supports a pair of formations projecting toward one another and defining a respective throat engageable with a respective one of said articles in said receptacle on each side of said article, said throats of said receptacles are horizontally aligned so that one of said articles which is contained in one of said receptacles and has a thickness that is slightly smaller than the width of each of said throats is tiltable in said receptacle about fulcrums formed by said tracks at said throats, and said tracks of each of said receptacles are provided with stops for limiting the tilting movement of such article in said receptacle, said throats being spaced above said supports, each of said tracks having horizontally spaced apart guiding surfaces, which diverge symmetrically from said throat in upward and downward directions.

8. In a container for holding parallelepipedic articles comprising a bottom and side walls defining an upwardly open space, said space being delimited at least in part by two horizontally spaced apart vertical walls rising from said bottom, and a plurality of receptacles provided between said two vertical walls and adapted to slidably receive respective ones of said articles, each of said receptacles comprising two upwardly open horizontally spaced apart tracks extending adjacent to confronting side faces of respective ones of said vertical walls for receiving opposite edges of respective articles, the improvement residing in that each of said receptacles comprises laterally spaced apart supports disposed near said bottom and adapted to slidably support one of said articles received in the respective receptacle, each of said tracks of each of said receptacles has above the respective supports a pair of formations projecting toward one another and defining a respective throat engageable with a respective one of said articles in said receptacle on each side of said article, said throats of each of said receptacles are horizontally aligned so that one of said articles which is contained in one of said receptacles and has a thickness that is slightly smaller than the width of each of said throats is tiltable in said receptacle about fulcrums formed by said tracks at said throats, and said tracks of each of said receptacles are provided with stops for limiting the tilting movement of such article in said receptacle, each of said tracks being open at its top and which is adapted to hold parallelepipedic articles consisting of magnetic tape cassettes, each of which has a laterally extending guide projection, wherein at least one of said tracks of each of said receptacles is provided at its top with two transverse lugs, which extend from opposite sides of said track toward each other and define between them a centrally disposed gap for receiving and guiding said guide extension of one of said cassettes as it enters said receptacle.

9. The improvement set forth in claim 8, wherein each of said tracks of each of said receptacles is provided with such transverse lugs.

10. The improvement set forth in claim 8, wherein each of said transverse lugs has a downwardly directed free end portion.

* * * * *